(12) United States Patent
Woller

(10) Patent No.: US 7,089,926 B2
(45) Date of Patent: Aug. 15, 2006

(54) LOCK-IN SUPPORT SYSTEM FOR GRILL

(75) Inventor: Robert Woller, Salem, WI (US)

(73) Assignee: Kay Home Products, Inc., Cleveland, OH (US)

( * ) Notice: Subject to any disclaimer, the term of this patent is extended or adjusted under 35 U.S.C. 154(b) by 175 days.

(21) Appl. No.: 10/807,960

(22) Filed: Mar. 24, 2004

(65) Prior Publication Data

US 2005/0211237 A1    Sep. 29, 2005

(51) Int. Cl.
*A47J 37/00* (2006.01)
(52) U.S. Cl. .............................. 126/25 R; 126/304 R; 126/9 R; 126/30
(58) Field of Classification Search ............. 126/25 R, 126/304 R, 9 R, 30, 305, 306, 9 B; 248/150, 248/151, 152, 153, 154
See application file for complete search history.

(56) References Cited

U.S. PATENT DOCUMENTS

| | | | | |
|---|---|---|---|---|
| 3,359,963 A | * | 12/1967 | Kostial | ...................... 126/9 R |
| 3,452,736 A | * | 7/1969 | Harff et al. | ................ 126/25 R |
| 3,611,915 A | * | 10/1971 | Glaser et al. | ................. 99/445 |
| 4,535,749 A | | 8/1985 | Schlosser et al. | |
| 4,836,179 A | * | 6/1989 | Schlosser et al. | ......... 126/25 R |
| 5,983,882 A | | 11/1999 | Ceravolo | |
| 6,263,784 B1 | | 7/2001 | Wodeslavsky | |

* cited by examiner

*Primary Examiner*—Alfred Basichas
(74) *Attorney, Agent, or Firm*—D. Peter Hochberg; Sean Mellino

(57) ABSTRACT

The present invention relates to the support mechanism for a grill having a grill bottom, grates for supporting fuel and food, and a cover. The mechanism is detachably attached to the grill without fasteners by projecting pieces that go through holes in the bottom portion or kettle of the grill, some of the projecting pieces supporting the grate for the fuel and other projecting pieces supporting the grate for the food. Only one fastener, for example, a screw with a wing nut, is used to support the mechanism and fasten it to the grill bottom. In a preferred embodiment, the mechanism also has toggle locks to lock together the grill bottom and the cover.

21 Claims, 8 Drawing Sheets

LOCK-IN SUPPORT SYSTEM FOR GRILL

BACKGROUND OF THE INVENTION

1. Field of the Invention

The present invention relates generally to a grill having a grill bottom, grates for supporting coals and food, and a cover. The invention relates more specifically to a support mechanism for a grill, the mechanism detachably attaching to the bottom portion or kettle of the grill without fasteners and having projecting pieces that go through holes in the kettle, some of the projecting pieces supporting the grate for the coals and other projecting pieces supporting the grate for the food.

2. Description of Prior Art

Grills to be used outdoors for cooking a variety of food items have long been known. There are grills, for example, which are smokeless, such as the one disclosed in U.S. Pat. No. 6,263,784 B1, and grills which have two or more food supporting sections, such as the one disclosed in U.S. Pat. No. 5,983,882. Further, the grill disclosed in Schlosser et al., U.S. Pat. No. 4,535,749, is designed to be permanently assembled and installed in a backyard or on a large patio. Schlosser et al. discloses a kettle grill whose bottom is generally semi-hemispherical; the legs are attached to the bottom using screws or bolts fastened with nuts. These bolts extend through the legs and the grill, so that the rack which holds the charcoal can be placed on or supported by these bolts. Thus this grill, and other similar grills, contain many parts, including multiple screws or bolts with nuts or wing nuts, and often require special equipment for assembly. Also, the legs of this grill attach on the bottom portion of the bottom half of the grill; the legs are bolted to the grill both on the sides and in the center of the grill bottom. Grills having multiple fasteners are difficult to assemble, suffer from failure to be assembled due to lost parts, and are sometimes incorrectly assembled due to using the fasteners incorrectly or not adequately tightening the fasteners.

There is a need for a grill having a support system which contains a minimal number of parts, is sturdy and is easy to assemble and disassemble without the use of special tools or equipment. The present invention fills the need for such a grill in a unique manner.

SUMMARY OF THE INVENTION

An object of this invention is to provide a system which supports a grill and is easy to assemble and disassemble without the use of special tools or equipment.

A further object of this invention is to provide a system which supports a grill and also supports the grates or racks for holding food and fuel within the grill.

A further object of this invention is to provide a system which supports a grill and is attached to the grill without using screws or other fasteners.

Another object of this invention is to provide a system which supports a grill and contains a minimal number of parts.

Another object of this invention is to provide a system which supports a grill which includes toggle clips for locking a cover onto the grill.

Yet another object of this invention is to provide a system which supports a grill which is inexpensive to manufacture.

These and other objects will become apparent from the following description of a preferred embodiment taken together with the accompanying drawings.

The foregoing objects are achieved according to the preferred embodiment of the invention by a support system which is detachably attached to the grill without fasteners and which has projecting pieces that go through holes in the bottom portion or kettle of the grill, some projecting pieces supporting the grate for the coals and other projecting pieces supporting the grate for the food.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENT

Figure 4:
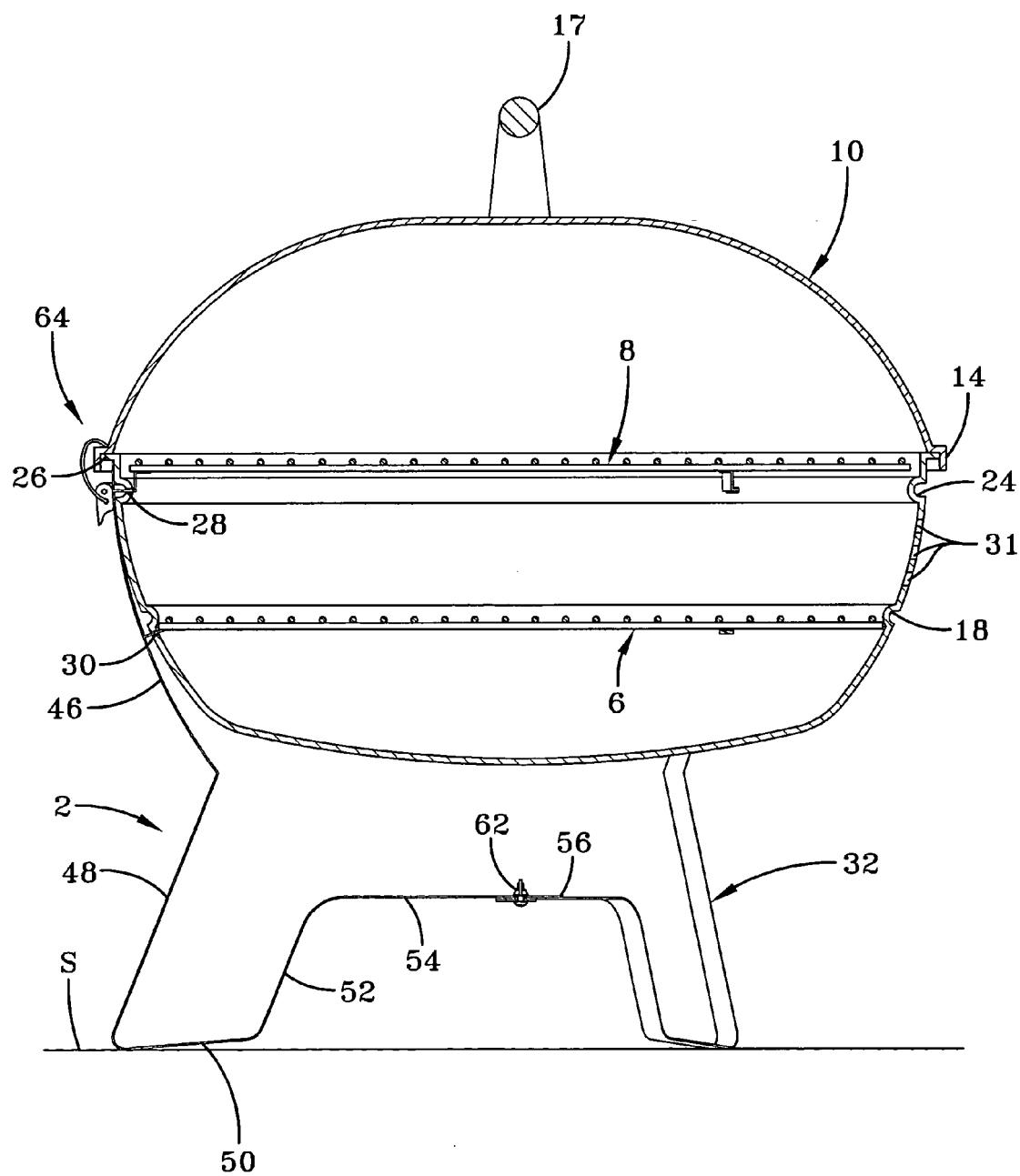
FIG. 4 is a section through the direction line 4—4 in FIG. 1.
Figure 5:
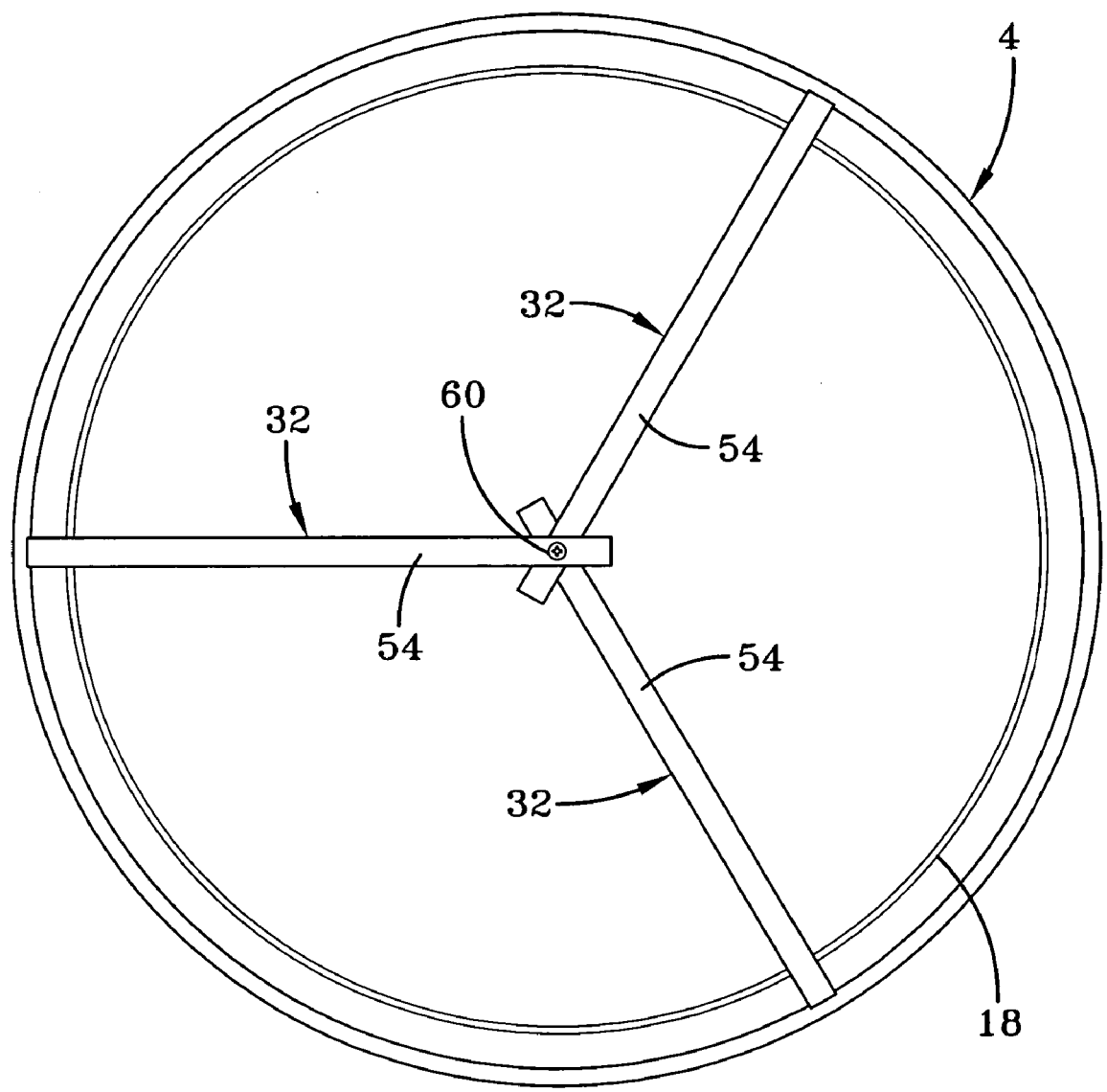
FIG. 5 is a bottom view of the grill and support mechanism of FIG. 1.

Referring to the drawings, which are used for illustration and not to limit the invention therewith, a system or support mechanism 2 for supporting a grill having a grill bottom, kettle or bowl 4, a grate or rack 6 for supporting charcoal briquettes or other barbeque fuel such as gas, or gas burners with sear trays, a grate or rack 8 for supporting food to be cooked, and a cover 10, is shown. The grill cover 10 is generally semi-hemispherical in shape, being flat on its top 12 and having generally smooth sides curving outwardly and terminating in an inverted L-shaped edge 14 (when viewed in cross section as shown in FIG. 4) which extends around the entire circumference of the cover. Each side of the L of the L-shaped edge 14 can be about ¼ inch wide. Vent openings 15 and a rotatable vent cover 16 (shown in phantom) and a handle 17, which can be attached near the flat top 12 of the cover using a pin or screw (not shown), would be included as part of the grill cover.

The grill bottom 4 is generally kettle- or bowl-shaped; its sides are generally smooth but include two indentations 18, 24 (forming a ridge or shelf on the inside of the grill bottom) where the side curves or bends inwardly forming a ¼ inch bump or shelf on the inside of the bowl. The center indentations 18 can be in the middle of the grill bottom 4, about half way between the bottom, closed end, of the bowl 20 and the top, open end 22; the center indentation 18 can be about ¼ inch deep and can extend the entire circumference of the bowl. The top indentation 24 can also extend the entire circumference of the bowl and can also be about ¼ inch deep, but it is located within an inch of the top, open end 22 of the bowl. On its open end, the bowl terminates in a curved or circular (in cross section) border or rim 26, forming a narrow horizontally projecting edge which extends over the top edge 22 of the grill bottom 4. The rim 26 cooperates with L-shaped edge 14 of cover 10 to close the grill and prevent rain water and the like from leaking in, and reduce the amount of smoke and odors leaving the grill. Indentation 18, indentation 24, and rim 26 are all generally parallel, offset and coaxial, and concentric.

Below the rim, there are three generally rectangular upper openings 28 in the top ridge 24 of the grill bottom for receiving supporting apparatus, such as a metal shelf, metal plate or flat metal piece, (extending from a leg piece as described below) for supporting the food rack 8. Further below the rim, and slightly below the center indentation 18, there are three generally rectangular, co-planar lower openings 30 in the grill for receiving supporting apparatus, such as a metal shelf, metal plate or flat metal piece (extending from a leg piece also as described below), for supporting the charcoal or fuel rack 6. The upper openings 28 are equidistantly spaced in the same plane along the circumference of the bowl so that rack 8 will remain flat when supported in grill bottom 4. Similarly, the lower openings 30 are equidistantly spaced in the same plane along the circumference of the bowl for supporting rack 6 in a flat position, each lower opening being directly below an upper opening. Kettle vent openings 31 are provided for air to ventilate across the barbeque fuel and can include a bent out pair of slits 31 through kettle 4, which could have protrusions such as bent out parts of the kettle beneath the respective slits.

Figure 2:
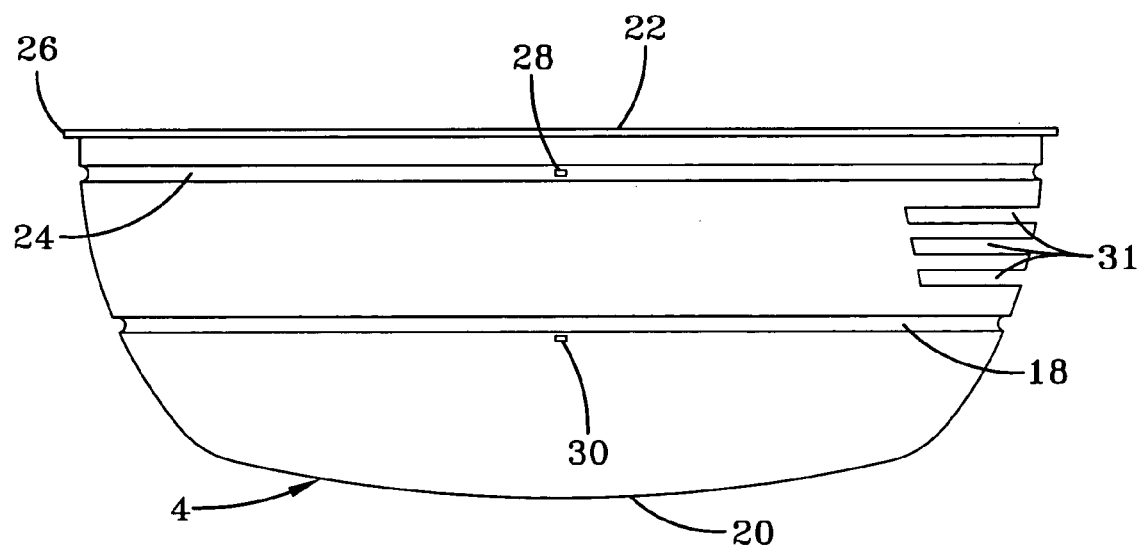
FIG. 2 is a side view of the grill bottom kettle of FIG. 1 without the support mechanism.
Figure 2A:
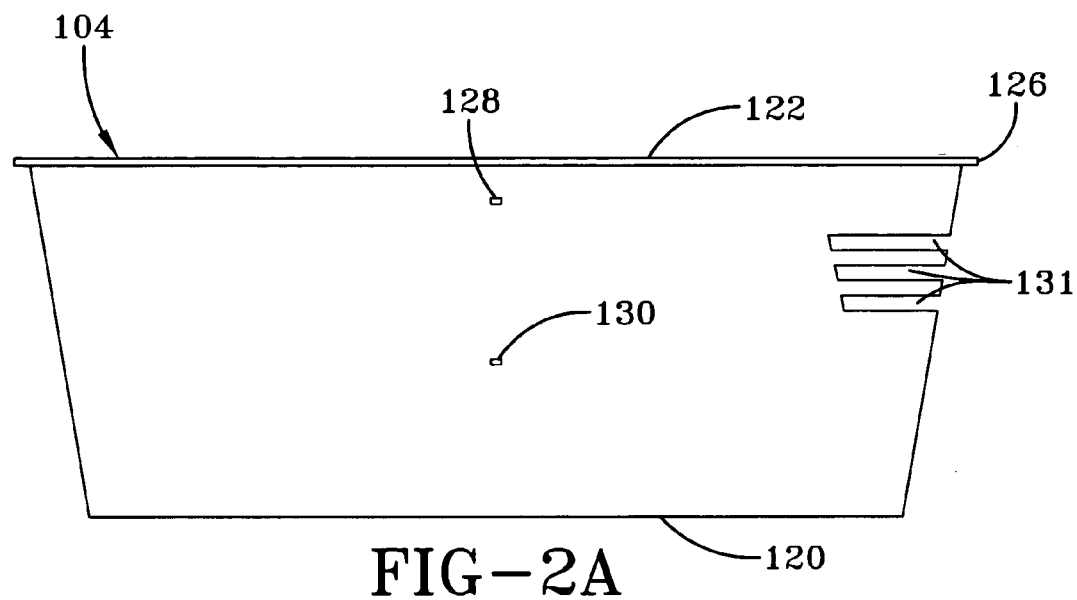
FIG. 2a is a side view of an alternate embodiment of the grill bottom kettle.
Figure 2B:
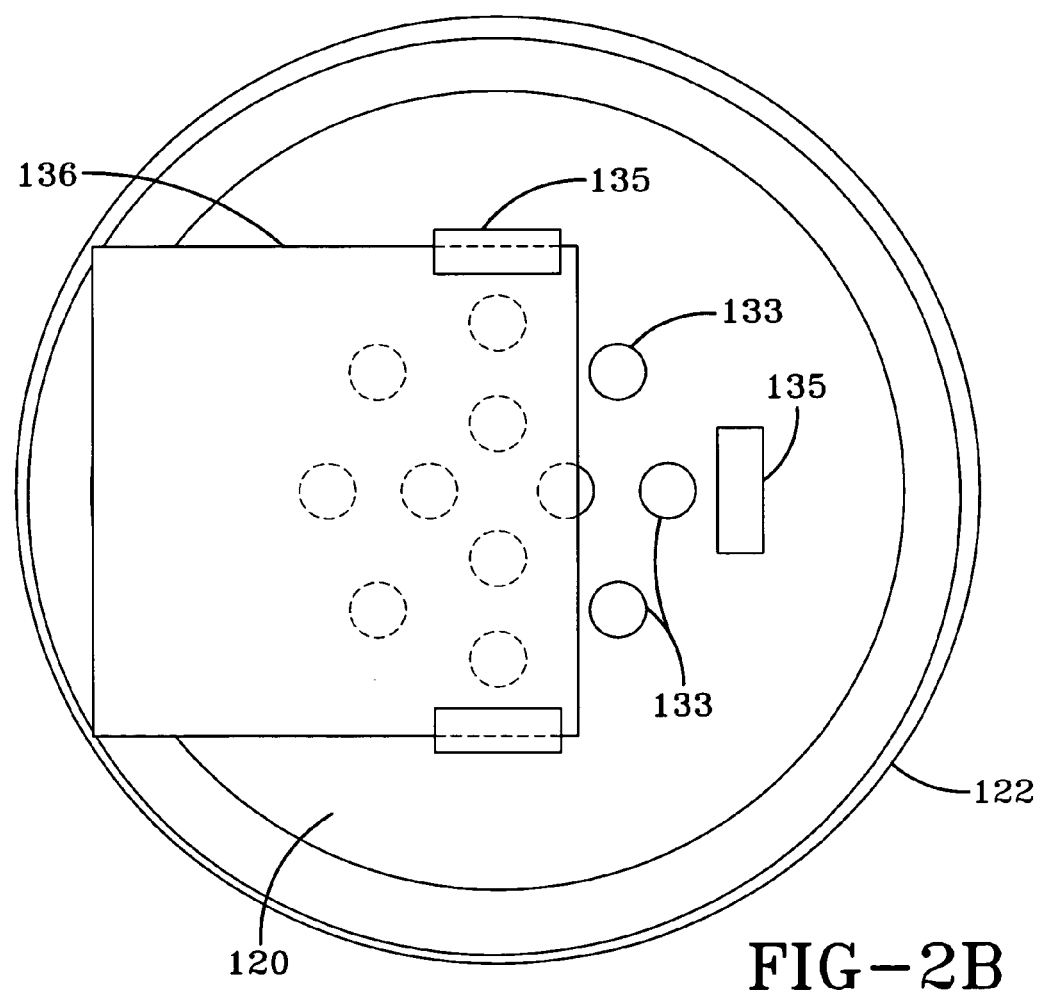
FIG. 2b is a bottom view of an alternate embodiment of the grill bottom kettle.

In an alternative embodiment, shown in FIGS. 2a and 2b, the grill bottom 104 has generally sloping sides and a flat bottom 120, and is configured in the form of a truncated cone. On its open end, the grill bottom 104 terminates in a curved or circular border or rim 126, forming a narrow horizontally projecting edge which extends from the top edge 122 of the grill bottom 104. The rim 126 cooperates with L-shaped edge 14 of cover 10 to close the grill and reduce the exhaustion of smoke and odors. Vent holes 133 can be made in the bottom 120, and holders or tabs 135 can also be on the bottom 120. The holders 135 can secure a detachable ashtray 136 (shown partially secured) which receives the ashes from the fuel when the grill is in use.

Between ¼ inch and ¾ inch below the rim 126 of the grill bottom 104, there are three generally rectangular upper openings 128 for receiving supporting apparatus, such as a metal shelf, metal plate or flat metal piece, (formed from part of a leg piece as described below) for supporting the food rack 8. Further below the rim, and below the center of the grill bottom, there are three generally rectangular, co-planar lower openings 130 in the grill bottom for receiving supporting apparatus, such as a metal shelf, metal plate or flat metal piece (formed from a leg piece, also as described below), for supporting the fuel rack 6. The upper openings 128 are equidistantly spaced in the same plane along the circumference of the bowl so that rack 8 will remain flat when supported in grill bottom 104. Similarly, the lower openings 130 are equidistantly spaced in the same plane along the circumference of the bowl for supporting rack 6 in a flat position, each lower opening being directly below an upper opening. Kettle vent openings 131, which can have protrusions extending from beneath the openings, are provided in the grill bottom 104 for air to ventilate across the barbeque fuel. Openings 131 can include a bent out pair of slits through the grill bottom.

Figure 3:
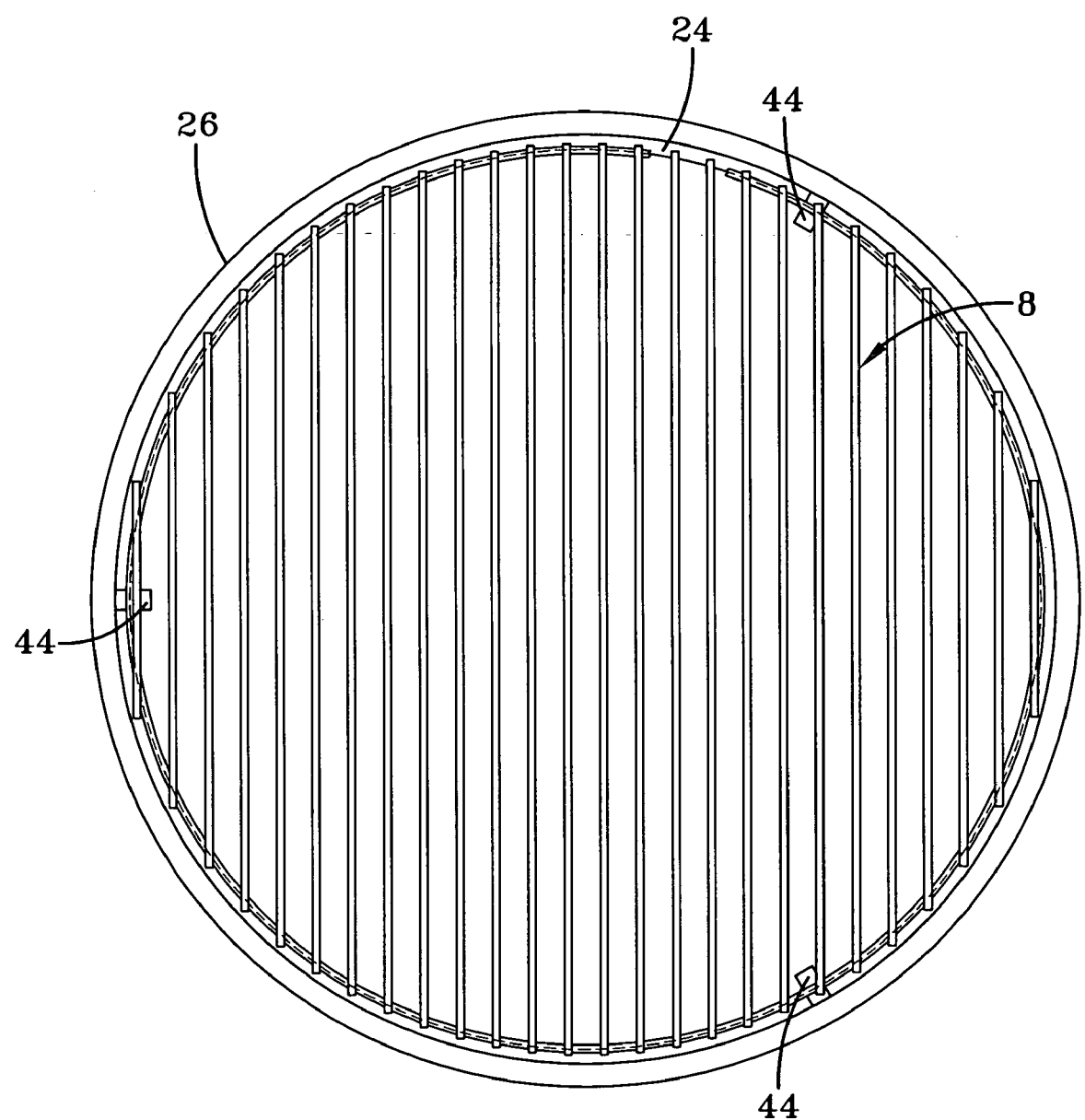
FIG. 3 is a top view of the grill bottom kettle and support mechanism of FIG. 1.
Figure 6:
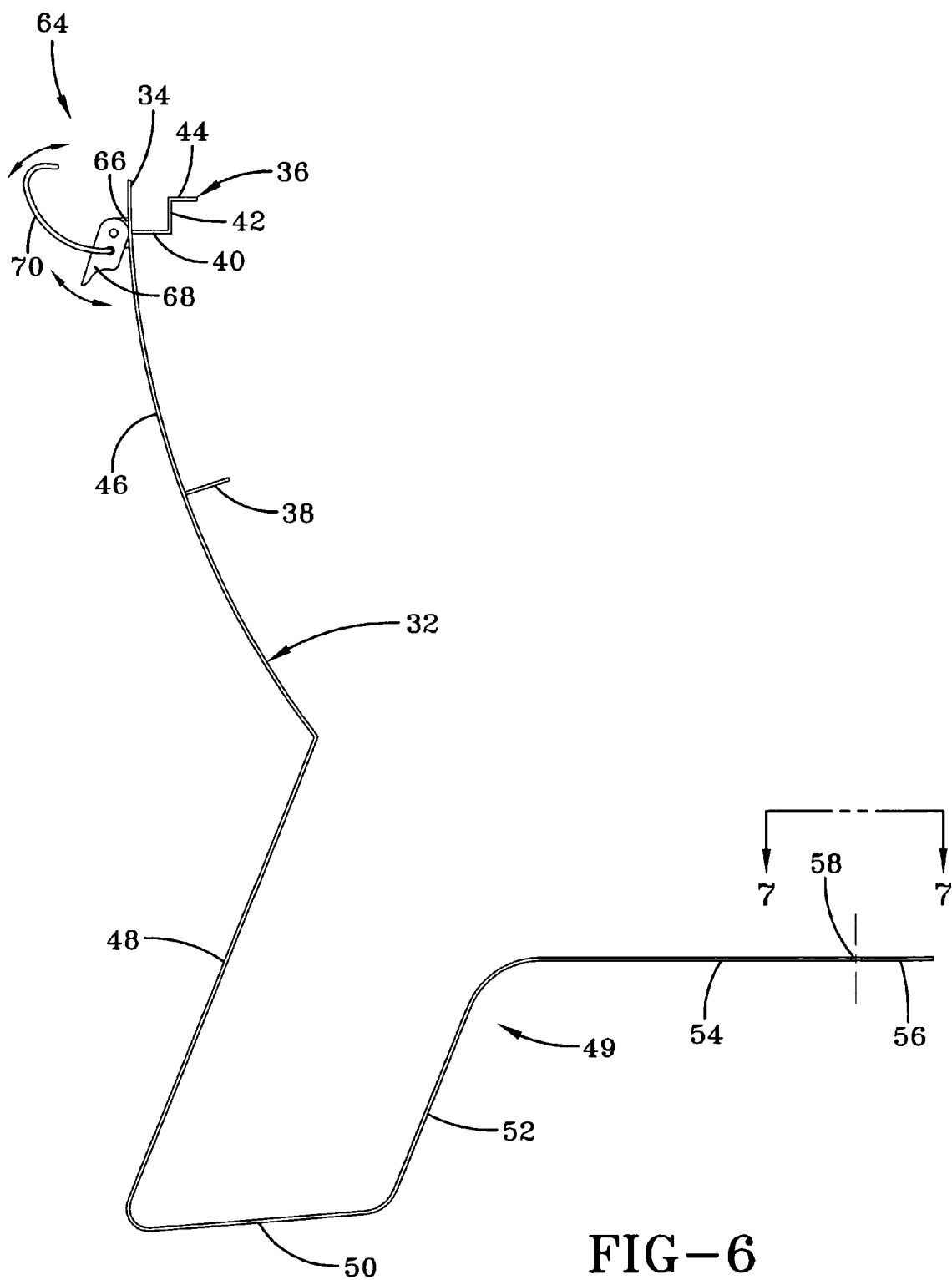
FIG. 6 is a side view of a leg piece of the support mechanism.
Figure 7:
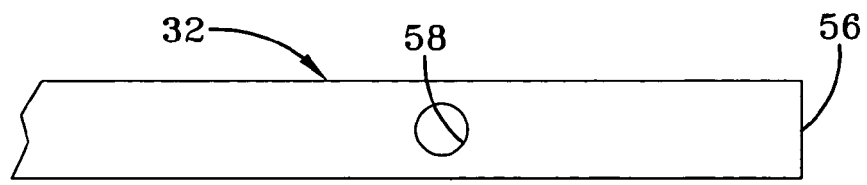
FIG. 7 is a top view of the lower portion of the leg piece of the support mechanism.
Figure 8:
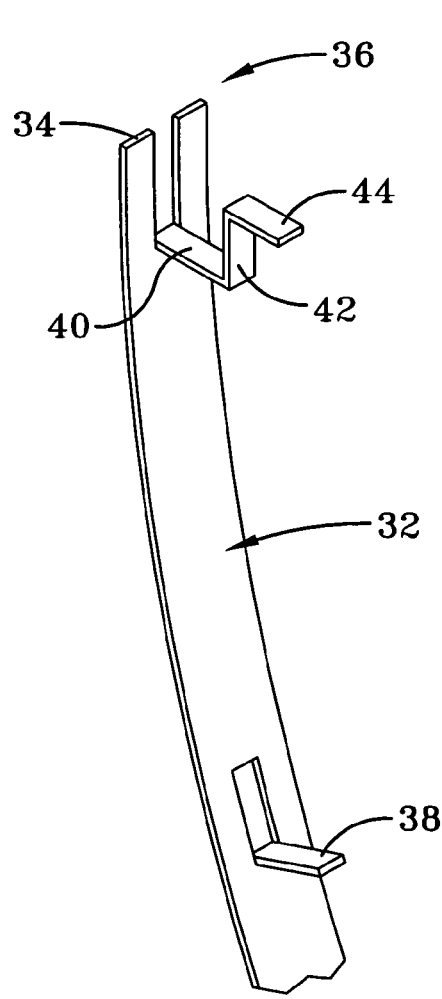
FIG. 8 is a perspective view of the upper portion of the leg piece of the support mechanism.

In either embodiment, the support mechanism 2 consists of three identical leg pieces 32, shown most clearly in FIG. 6. Each leg piece has a top end 34, which does not extend above the level of rim 26, from which is stamped or otherwise bent an upper generally inverted L-shaped upper bent portion or upper tab 36 which is transverse to the body of each leg piece 32, and which can be received by one of the upper openings 28 in grill bottom 4 and, below the upper tab 36, is a lower bent portion or lower tab 38 which is generally parallel to upper tab 36, and which can be received by one of the lower openings 30. In the preferred embodiment, the leg pieces 32 are metal, and preferably aluminum or other lightweight metal alloy, although leg pieces could also be made from stainless steel, galvanized steel, or other sheet metal products which could be coated for heat and weather resistance. Upper tab 36 is advantageously bent from leg piece 32 so that the upper tab 36 extends to form a first horizontal portion 40, followed by a vertical portion 42, from which extends a second horizontal portion 44 from the leg piece, the second horizontal extension or portion 44 extending toward the center of the grill bottom bowl 4. Portion 40 provides a shoulder for abutting the upper surface defining opening 28, and extension 44 forms a shelf for receiving the rim of grate 8. As seen in FIG. 4. vertical portion 42 contacts the inside wall of grill bottom 4 and upper portion 46 of leg pieces 32 contact the outside wall of grill bottom bowl 4 to stabilize and secure in place support mechanism 2 with the grill. The food rack 8 can be a circular grate or rack with the circular rim as shown in FIG. 3, and which sits on extension 44 so that the leg pieces support the food rack 8. In a preferred embodiment, the lower tab 38 extends generally horizontally from the leg piece toward the center of the grill bottom bowl 4, and forms a shelf on which the rim of the rack 6 for holding charcoal or other barbeque fuel can be placed in a manner similar to that of the food rack 8.

Leg pieces 32 each have connected to each other in sequence an upper portion 46, a middle portion 48, and a bottom portion 49. The upper portion 46, which constitutes about one third of leg piece 32 (and about one half of its outer generally vertical segment), is shown curved to match the contour of the grill bottom kettle 4. For use with an alternative embodiment of the bottom kettle, shown in FIG. 2a, the upper portion 46 can be straight. When installed, the top end 34 of the leg piece 32 extends through openings 28, 128 under the rolled metal forming the rim 26, 126 of the grill bottom 4, 104. The middle portion 48 of the leg piece 32, also constituting about one third of leg piece 32, is generally straight and extends away from the upper portion 46 at an angle of between 90 and 150 degrees and extends away from the grill bottom 20 at an angle of about 30 degrees from vertical (measured clockwise from the vertical extending beneath the intersection of portions 46 and 48). The leg piece 32 will contact the support surface s in a plane vertically under the rim 26 of the grill bottom kettle 4 for increased stability of the support system. The bottom third portion 49 of leg piece 32 forms an inner radial portion which extends upward at an internal angle of between 60 and 90 degrees from the lower portion of middle piece 48 (measured clockwise from the middle piece 48) and extends generally up and under the grill bottom 20. This bottom third portion 49 contains three sections, the first section forming a foot 50 which is almost horizontal, the second section 52 extending upward from the first portion and being generally parallel to the middle portion 48, and the third section 54 extending generally horizontally inward underneath the grill bottom, and this third section culminates in a loose or free end 56. The loose end 56 of the leg piece 32 contains an opening 58 for receiving fastening apparatus. The openings 58 for all loose ends 56 of leg pieces can be joined together by placing a screw 60 with wing nut 62 or other fastening apparatus through all of the openings simultaneously, fastening the leg pieces 32 to each other to complete the support mechanism 2.

Figure 9:
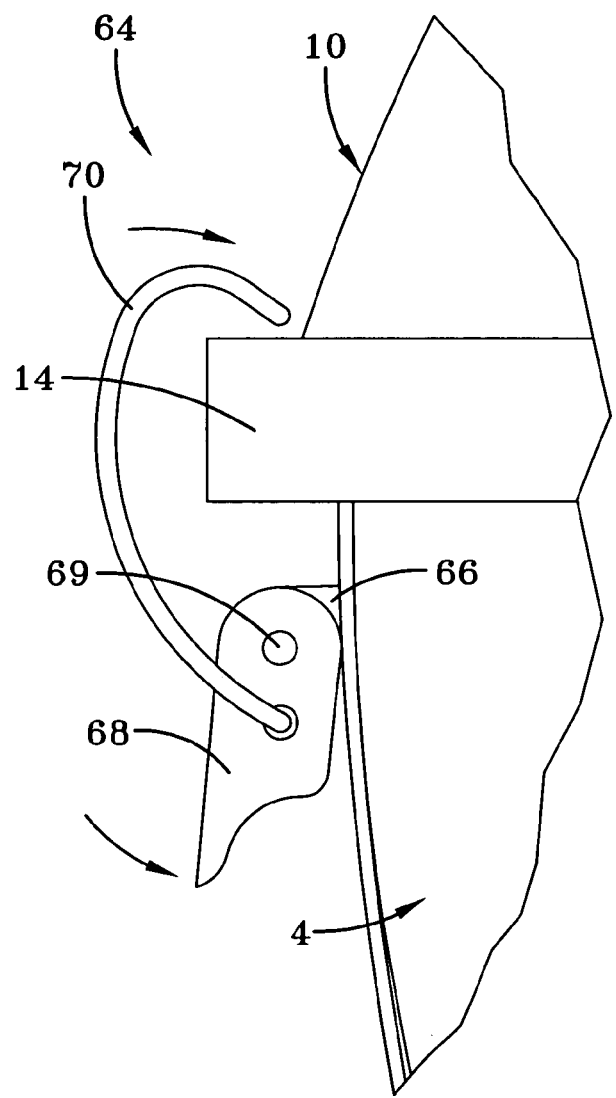
FIG. 9 is a detailed view of the toggle lock in the locked position.

In a preferred embodiment, each leg piece 32 also includes a toggle lock 64 between the upper tab 36 and lower tab 38 for detachably attaching the support mechanism 2 and grill bottom kettle 4 to the grill cover 10. The toggle lock 64 can be fastened by means such as bolting, welding, riveting or soldering, to the upper portion 46 of the leg piece 32. As shown in FIG. 9, the toggle lock 64 is depicted in its locked condition. It is comprised of a base piece 66, a locking arm 68 pivotally mounted on an axle 69 extending through a pair of outwardly extending brackets of base piece 66, and a locking wire 70 pivotally attached to arm 68. Toggle lock 64 is a locking device which is stable in both the locked and unlocked positions, so that, when in the locked position, it is not biased toward the locked position or vice versa. Use of the toggle lock 64 is as follows. One places the grill cover 10 onto the grill bottom kettle 4 so that the rim of the grill bottom kettle 4 is engaged with the L-shaped edge 14 of the grill cover 10. Next, locking arm 68 is pivoted toward or above the horizontal position so that the locking wire 70 can move freely, and can be pivoted onto the L-shaped edge 14 of the grill cover. Finally, the locking arm 68 is forced downward over its center position so that it pressed against or abuts the base piece 66 of the toggle lock, to bias locking wire against the upper surface of rim 14 of cover 10 for locking or attaching the grill cover 10 to the grill bottom kettle 4. To unlock the toggle lock 64, one simply pivots the locking arm 68 towards or over its center position to the horizontal position, releasing the locking wire 70 which then can be rotated from the L-shaped edge 14 of the grill cover 10. Once all of toggle locks 64 are moved from their locked to their open conditions, the cover can be removed.

The three leg pieces 32 are evenly spaced around the perimeter of the grill bottom 4, 104 for stability. The upper openings 28, 128 in the grill bottom 4, 104 are also evenly spaced around the perimeter of the grill bottom, preferably about one inch below the rim 26, 126. The lower openings 30, 130 in the grill bottom are evenly spaced around the perimeter of the grill bottom, preferably between two and four inches below the rim 26, 126.

Figure 1:
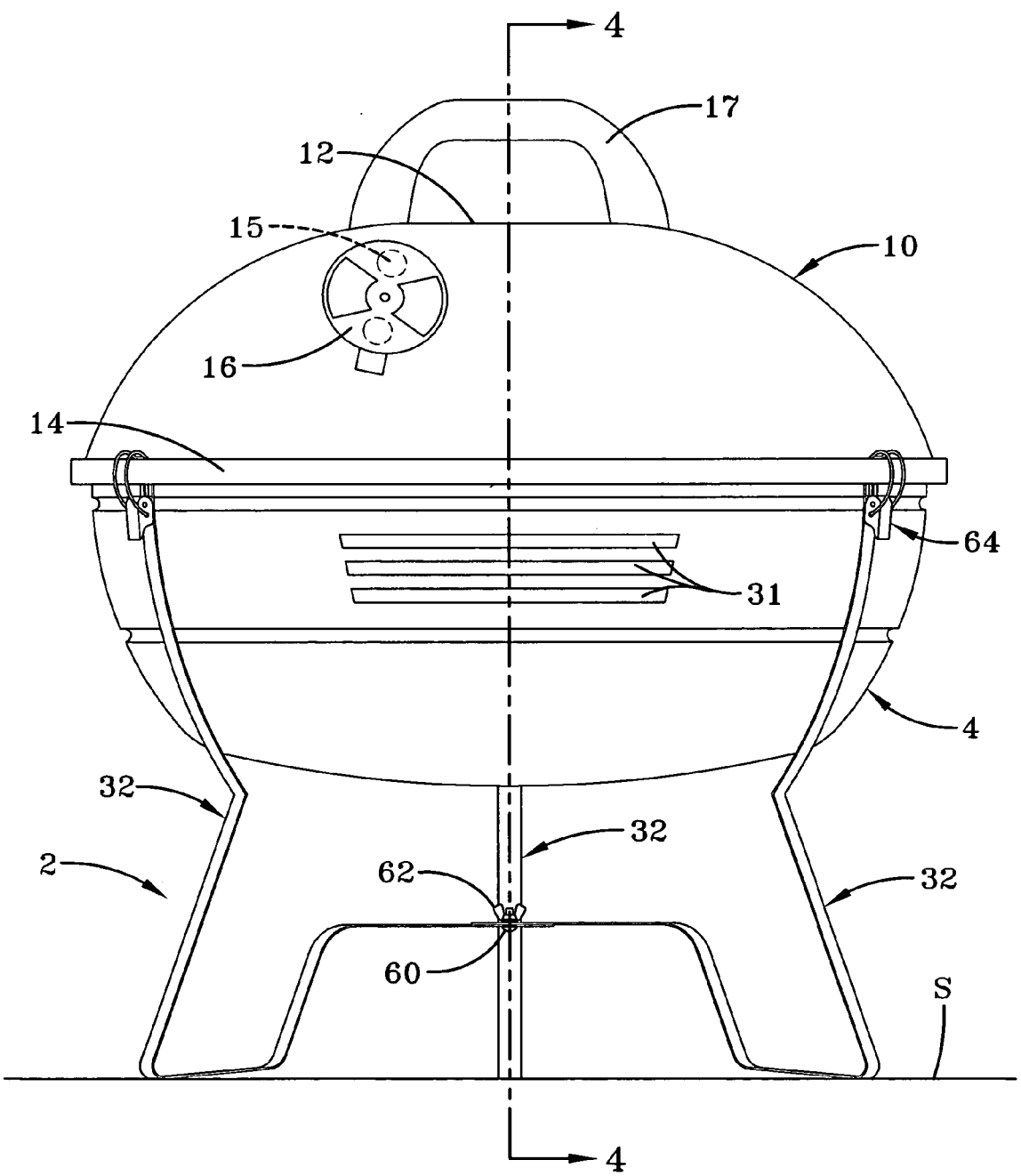
FIG. 1 is a perspective view of a grill with the support mechanism.
Figure 3A:
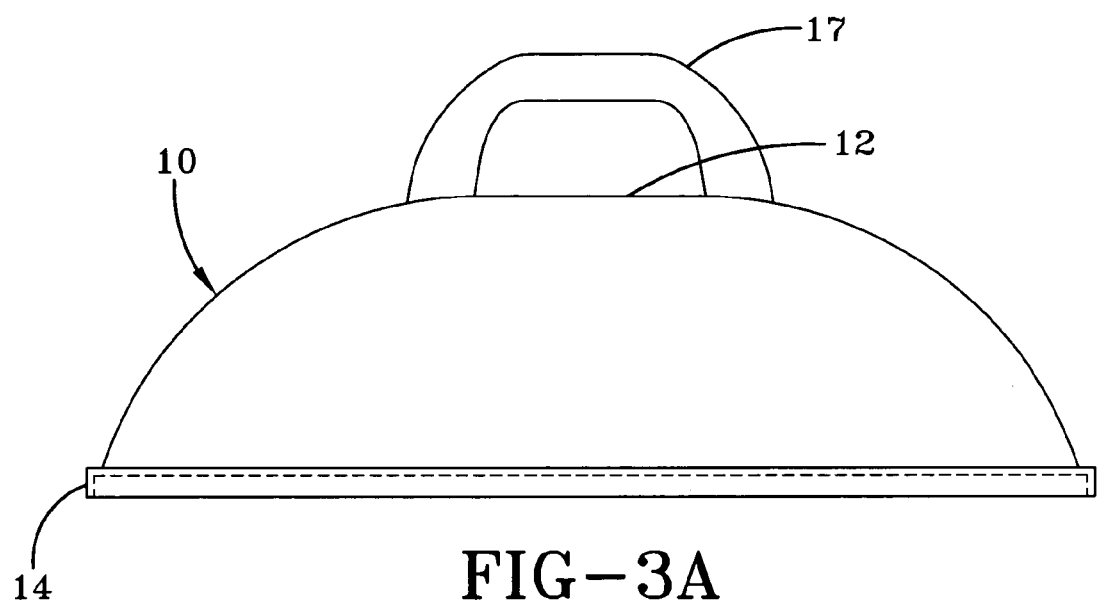
FIG. 3a is a side view of the grill cover of FIG. 1.

Assembly of the current invention is easy. First, one screws the handle 16 onto the grill cover 10 (although this step could be done at any time). Optionally, one can attach a vent cover to the grill cover over vent openings 15 by means of a connector inserted through an artifice between vent openings 15 as shown in FIG. 1. Next, one places the grill bottom 4 with its rim 26, 126 on a flat surface and its lower surface 20, 120 facing up. In an embodiment with an ashtray 136, the ashtray is attached to the grill bottom 120 by sliding the ashtray into the holders 135. In any embodiment, to install the leg pieces 32, one inserts the top end 34 of each leg piece 32, in turn, under the exterior lip or rim 26, 126 of the grill bottom 4, 104. Next, for each leg piece 32, upper tab 36 is placed through an upper opening 28, 128 and lower tab 38 is placed through the lower opening 30, 130 beneath the corresponding upper opening 28 in the grill bottom 4, 104. Once all of the leg pieces 32 are in place, the fastening apparatus, such as a screw 60, is inserted through the leg openings 58 in each of the loose ends 56 of the three legs 32. The apparatus is fastened together by, for example, screwing a wing nut 62 onto the screw 60 (which preferably has a wing handle fixed thereto for rotating screw 60). Next, one turns over the grill bottom 4 and attached leg pieces 32 so that the leg pieces are on the desired support surface s, such as a table or patio, and the charcoal rack 6 is put on the lower tabs 38 in the grill bottom 4 and the cooking or food rack 8 is put on upper tabs 36 in the grill bottom 4. Finally, the cover 10 is placed on the grill bottom and the cover 10 is locked onto the grill bottom 4 with the three toggle locks 64.

Grill cover 10 and grill bottom 4 can be made of any stiff sheet metal which is strong enough to receive random blows, be resistant to heat from hot fuel and not subject to corrosion from water or from heating food. The metal could be aluminum, galvanized steel or stainless steel. Metals subject to corrosion could be coated with a heat and chip resistant paint which are commonly used in the market.

The invention has been described with particular emphasis on the preferred embodiments. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention or the equivalents thereof.

I claim:

1. A support system for a portable grill having a grill bottom, a first rack for holding items, said grill bottom having an opened top defined by an annular rim, an inside wall, an outside wall and having a first set of coplanar openings in one plane, said system comprising:

a set of legs, each of the legs having a first set of support members for extending through the first set of coplanar openings in the grill bottom and for supporting the first rack by gravity without any additional fasteners, said legs fastenable to each other separate from the grill bottom, wherein said support members contact said inside wall of said grill bottom and said set of legs contact said outside wall of said grill bottom and add stability to the portable grill.

2. The support system according to claim 1, wherein said set of legs do not extend above the level of said annular rim.

3. A support system as claimed in claim 1, wherein the first rack holds food, and wherein the portable grill has a second rack for holding fuel, and further wherein the grill bottom has a second set of coplanar openings in a second plane closer to the bottom of the grill than the first set of openings;

wherein said set of legs has a second set of support members for extending through the second set of openings for supporting the second rack by gravity without additional fasteners.

4. A support system as claimed in claim 3, wherein the grill bottom has a grill rim defining a main opening into said grill bottom and the first set of coplanar openings are upper openings located about ¾" below the grill rim and the second set of coplanar openings are located about 3" below the grill rim.

5. A support system as claimed in claim 1, wherein the portable grill further includes a grill cover, said legs having latching members for latching said legs to said grill cover.

6. A support system as claimed in claim 5, wherein said latching members are toggle members.

7. A support system as claimed in claim 6, wherein said grill cover has a rim; and wherein said toggle members each comprise a base piece fixed to one of said legs, a locking arm axle parallel to the planes of the openings in the grill bottom, a locking arm pivotal about said axle, and a locking wire for engaging the rim of the grill cover for latching said grill cover to the grill bottom when said locking arm is pivoted to a locking condition.

8. A support system as claimed in claim 1, wherein said legs are made of metal.

9. A support system for a portable grill having a grill bottom, the grill bottom having a rim defining a main opening into the grill bottom, and a series of radial spaced upper openings in the grill bottom beneath the grill bottom rim, a series of radial spaced lower openings in the grill bottom beneath the upper openings, a first rack for holding food, a second rack for holding fuel, and a grill cover, said system comprising:

a plurality of legs, each leg having a top end, a bottom end, a lower tab, an upper tab, an upper portion beginning at the top end and generally matching the contour of the grill bottom, a middle portion being generally straight, and a lower portion having three sections, the first section forming a foot portion, the second section being generally parallel to the one-third of the leg at the middle, the third section being generally perpendicular to the second section, said third section having a leg fastener opening, the third section terminating in the bottom end; and a fastening apparatus for passing through the leg opening of all of said legs;

wherein the middle portion of each leg extends from the upper portion at an exterior angle between 90 and 150 degrees, the bottom portion extends from the middle portion at an interior angle between 60 and 90 degrees, said fastening apparatus fastens said bottom ends of said legs and said rim engages said top end of each of said legs, said upper openings receive said upper tabs, said lower openings receive said lower tabs, said upper tabs support said first rack and said lower tabs support said second rack.

10. A support system as claimed in claim 9, wherein said fastening apparatus is a screw and wing nut.

11. A support system as claimed in claim 9, wherein said fastening apparatus is a bolt and nut.

12. A support system as claimed in claim 9, wherein the upper openings are about ¾" below the rim.

13. A support system as claimed in claim 9, wherein the lower openings are between about 2" and 4" below the rim.

14. A support system as claimed in claim 9, wherein the upper openings are about ¾" below the grill rim and the lower openings are about 3" below the grill rim.

15. A support system as claimed in claim 9, wherein each leg further comprises a toggle lock for locking said leg to the grill cover.

16. A support system as claimed in claim 9, wherein said legs are made of metal.

17. A support system as claimed in claim 9, wherein the grill bottom is semi-hemispherical.

18. A support system for a portable grill having a grill bottom, the grill bottom having a rim defining a main opening into the grill bottom, and a series of radial spaced upper openings in the grill bottom beneath the grill bottom rim, a series of radial spaced lower openings in the grill bottom beneath the upper openings, a first rack for holding food, a second rack for holding fuel, and a grill cover, said system comprising:

a plurality of legs, each leg having a top end, a bottom end, a lower tab, an upper tab, a generally straight upper portion beginning at the top end, a middle portion being generally straight, and a lower portion having three sections, the first section forming a foot portion, the second section being generally parallel to the one-third of the leg at the middle, the third section being generally perpendicular to the second section, said third section having a leg fastener opening, the third section terminating in the bottom end; and a fastening apparatus for passing through said leg opening of all of said legs;

wherein the grill bottom is a generally truncated cone shape, and wherein the middle portion of each leg extends from the upper portion at an exterior angle between 90 and 150 degrees, the bottom portion extends from the middle portion at an interior angle between 60 and 90 degrees, said fastening apparatus fastens said bottom ends of said legs and the rim engages said top end of each of said legs, the upper openings receive said upper tabs, the lower openings receive said lower tabs, said upper tabs support the first rack and said lower tabs support the second rack.

19. A portable grill assembly system comprising:

a grill bottom having a rim;

first and second racks for holding items;

a grill cover;

at least two legs;

at least one upper opening in said grill bottom for each leg, said upper openings spaced equidistant on the circumference of said grill bottom below said rim;

at least one lower openings in said grill bottom for each leg, said lower openings spaced equidistant on the circumference of said grill bottom below the upper openings;

each of said legs having a top end, a bottom end, a lower tab, an upper tab, an upper portion beginning at the top end and generally matching the contour of the grill bottom, a middle portion being generally straight, and a lower portion having three sections, the first section forming a foot portion, the second section being generally parallel to the one-third of the leg at the middle, the third section being generally perpendicular to the second section, said third section having a leg fastener opening, the third section terminating in the bottom end; and a fastening apparatus for passing through said leg fastener opening of all of said legs;

wherein the middle portion of each leg extends from the upper portion at an exterior angle between 90 and 150 degrees, the bottom portion extends from the middle portion at an interior angle between 60 and 90 degrees, said fastening apparatus fastens said bottom ends of said legs and the rim engages said top end of each of said legs, said upper openings receive said upper tabs, said lower openings receive said lower tabs, said upper tabs support said first rack and said lower tabs support said second rack.

20. A support system for a portable grill having a grill bottom, a first rack for holding items and a second rack for holding fuel, said grill bottom having a first set of coplanar openings in one plane and a second set of coplanar openings in a second plane closer to the bottom of the grill than the first set of openings, said system comprising:
- a set of legs, each of the legs having:
  - a first set of support members for extending through the first set of coplanar openings in the grill bottom and for supporting the first rack by gravity without any additional fasteners, said legs fastenable to each other separate from the grill bottom; and
  - a second set of support members for extending through the second set of openings for supporting the second rack by gravity without additional fasteners.

21. The support system according to claim 20, wherein said first rack holds food.

* * * * *